(No Model.)

A. C. JACOBS.
HORSE COLLAR.

No. 440,571. Patented Nov. 11, 1890.

Witnesses

Inventor
Abraham C Jacobs
James J Sheehy
Attorney

UNITED STATES PATENT OFFICE.

ABRAHAM C. JACOBS, OF KENDALL, WISCONSIN.

HORSE-COLLAR.

SPECIFICATION forming part of Letters Patent No. 440,571, dated November 11, 1890.

Application filed February 20, 1890. Serial No. 341,185. (No model.)

*To all whom it may concern:*

Be it known that I, ABRAHAM C. JACOBS, a citizen of the United States, residing at Kendall, in the county of Monroe and State of Wisconsin, have invented certain new and useful Improvements in Horse-Collars; and I do declare the following to be a full, clear, and exact description of the invention, such as will enable others skilled in the art to which it appertains to make and use the same.

My invention relates to horse-collars; and it consists in an adjusting-pad and means for securing it to the collar, whereby the size of the collar can be increased or diminished to a certain extent, as will be hereinafter more particularly set forth, and pointed out in the claims.

Figure 1:
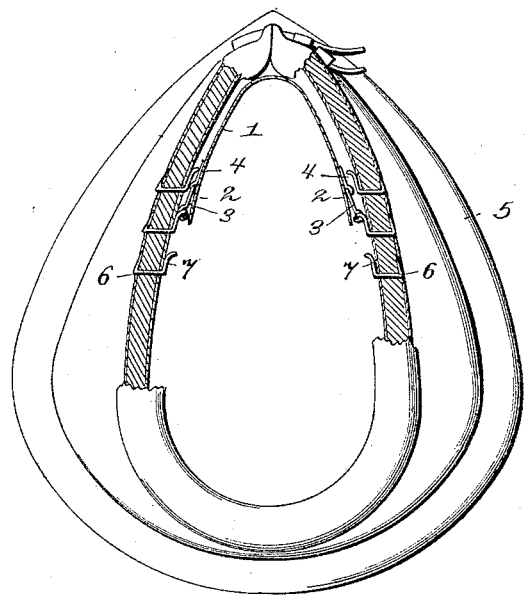
Figure 2:
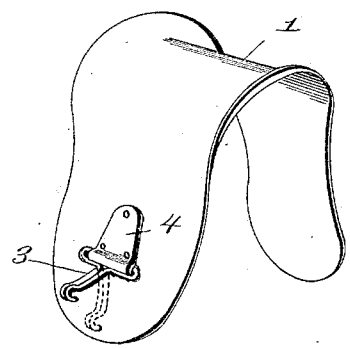
Figure 3:
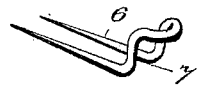

Referring to the accompanying drawings, Figure 1 is a front view, partly in section, of a collar having my improvements secured thereto. Fig. 2 is a perspective view of the pad, and Fig. 3 is a similar view of the staple by which the pad is secured to the collar.

The pad may be constructed out of one or more thicknesses of leather, or out of zinc or other metal which is pressed or formed into the desired shape. The shape which I show and have found to be very well adapted for the purpose is a substantial saddle shape, having the sides or flaps 2 of such shape as will best adapt the pad for use upon the particular style of collar for which it is intended. Near the lower end of each of the flaps and upon the outer side is a hook 3, having its open portion and point facing the flap, so that when it has been made to engage with the collar it will not be so readily unhooked as to be objectionable. The opposite or pivot end of the hook is made sufficiently broad or wide to make a substantial connection with the flap, which may be made by means of a plate 4, having the hook hinged thereto and secured to the flap.

In the drawings I have shown the hook made out of a piece of doubled wire having a hook formed at one end, and having the opposite ends of the wire separated and extended to form arms, which are then folded back upon themselves and inserted within the end of the plate, although it can be made in any other desired manner.

The pad is secured to the collar 5 by means of the staples 6 6, which are driven into the sides of collar at the seam between the rolls and opposite to each other, so that each end of the pad will be at the same distance from the top of the collar and cause it to fit nicely. Several of these staples are driven into the collar upon each side, so that by securing the hooks at different points the top of the pad can be placed at a greater or less distance from the lower end of the collar, and thus make the collar larger or smaller, as desired. Each of the staples is bent into an L shape near its outer end, and has the tip turned slightly outward, whereby a shoulder 7 is formed on each leg for driving it into the collar, and the tip is bent out sufficiently to permit of the ready entry of the hook 3 in securing the pad to the collar. I prefer to drive the staples into the collar between the rolls or walls, so that they will make the collar that much stronger, and so that it can be used without the pad, if desired, or, if the pad is used, the end of the staples will not bear against it and wear holes in it. I also prefer to arrange them with the bent portion extending toward the top of the collar, so that the hooks on the pad will tend to draw the bent portion more firmly against the sides of the collar.

In attaching the pad to the collar the hooks at the sides can be bent outwardly a little, as shown in dotted lines in Fig. 2, and made to engage with the staples, after which the hooks can be brought back into their normal position, which will cause the pad to lie flat against the sides of the collar, and as the edges of the pad are preferably thinned down to such an extent as that it will not hurt the animal's shoulders where the collar ends and the pad begins.

If it is desired to remove the collar by taking it off over the animal's head, the pad will permit of the collar spreading sufficiently to let it pass over easily without injuring the eyes or head.

Of course the invention can be applied to sweat-pads as well as to collars, as all that is necessary to do is to drive the staples through them and clinch them in the same manner as was done with the collar.

Having thus described my invention, but without limiting myself to the exact construction shown, I claim—

1. The combination, with an adjustable pad for horse-collars, having retaining-hooks pivotally secured to the flaps, of a collar provided with staples having their doubled portion bent into an L shape for securing the pad to the collar, substantially as described.

2. The combination, with a horse-collar each side of which is provided with a series of staples, the outer end of each of which is bent into an L shape, which projects toward the top of the collar and is bent slightly outward, of an adjustable pad having retaining-hooks secured to the sides of the flaps, substantially as described.

In testimony whereof I affix my signature in presence of two witnesses.

ABRAHAM C. JACOBS.

Witnesses:
J. W. DUNCAN,
HENRY FEASS.